United States Patent [19]
Levin et al.

[11] Patent Number: 6,127,743
[45] Date of Patent: Oct. 3, 2000

[54] UNIVERSAL HARMONIC MITIGATING SYSTEM

[75] Inventors: Michael I. Levin, Downsview; Anthony H. Hoevenaars, Aurora, both of Canada; Igor V. Volkov; Vladimir G. Kuznetsov, both of Kiev, Ukraine

[73] Assignee: Ontario Inc., North York, Canada

[21] Appl. No.: 09/422,963

[22] Filed: Oct. 22, 1999

[30] Foreign Application Priority Data

Apr. 9, 1999 [CA] Canada ................................ 2268480

[51] Int. Cl.[7] .............................................. H02J 1/00
[52] U.S. Cl. .............................................. 307/105
[58] Field of Search ...................... 363/40, 65; 323/207, 323/210, 211; 307/105; 310/68 R; 318/807; 333/22 R; 379/399; 722/186.07

[56] References Cited

U.S. PATENT DOCUMENTS

| 5,416,458 | 5/1995 | Menke et al. ........................ 336/12 |
| 5,444,609 | 8/1995 | Swamy et al. ........................ 363/47 |
| 5,726,804 | 3/1998 | Pecukonis et al. .................... 307/105 |
| 6,043,569 | 3/2000 | Ferguson ............................. 307/105 |

FOREIGN PATENT DOCUMENTS 375498  8/1984  Australia ...................... H02M 1/14

*Primary Examiner*—Stephen W. Jackson
*Assistant Examiner*—Sharon Polk
*Attorney, Agent, or Firm*—Dimock Stratton Clarizio; Mark B. Eisen

[57] ABSTRACT

A harmonic mitigating device connected between the power distribution system and the load provides a flux shifting multiple-winding reactor with a capacitor bank connected between the reactor windings. At least one line winding is oriented in a first polarity on a core, and at least one compensating winding oriented in the opposite polarity on the core and connected between the output of the first winding and the load. The opposing fluxes generated by the line winding and the compensating winding cancel and thus reduce the through-reactance of the device between the load and the power supply. The input of a cross-link circuit comprising a capacitor is connected between the line winding and the compensating winding. The reactance through the cross-link circuit to the neutral (or another phase) is lower than the reactance through the line winding. Harmonic currents thus flow through the cross-link circuit, and are largely prevented from penetrating the power distribution system.

40 Claims, 10 Drawing Sheets

Fundamental frequency: 60 Hz
Fundamental emps: 60 A rms

Harmonics: Fund — 100%
3rd — 65%
5th — 38%
7th — 13%
9th — 4.4%
11th — 5.3%

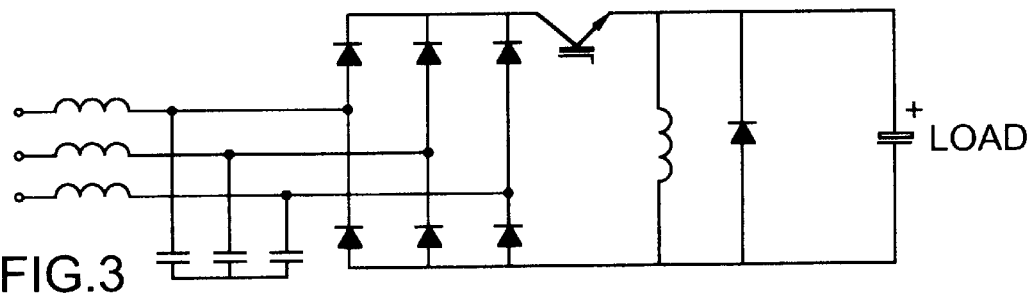
FIG.3
PRIOR ART
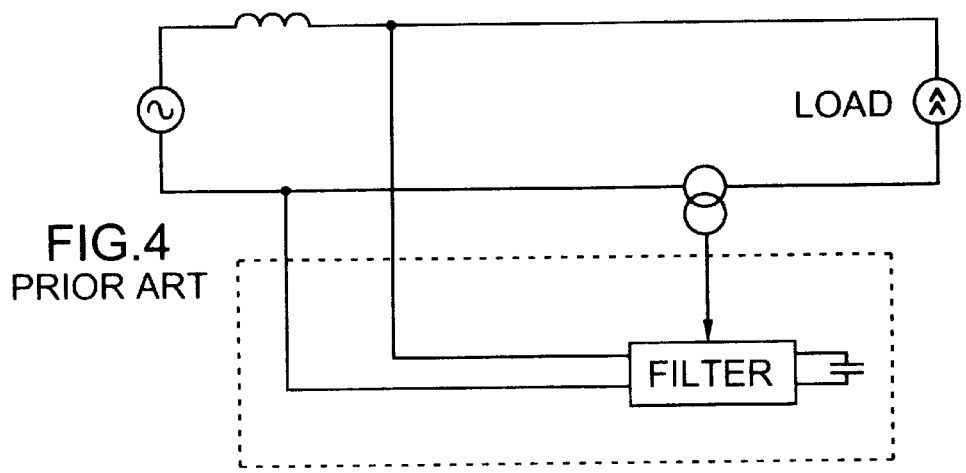
FIG.4
PRIOR ART
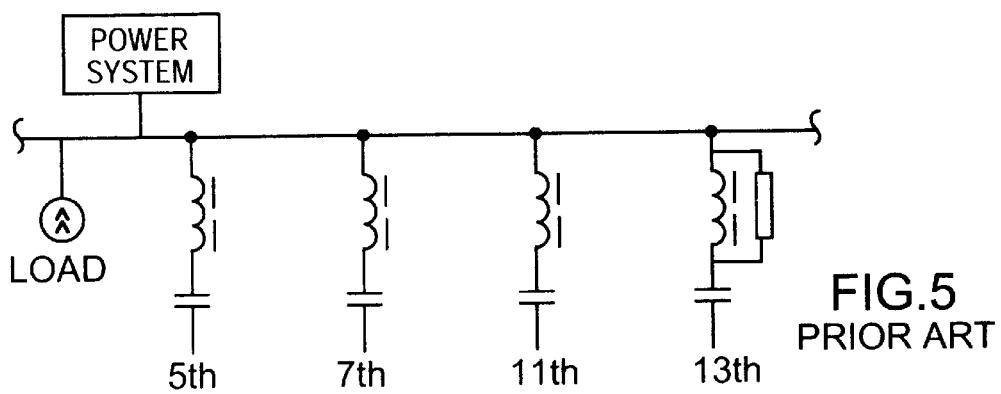
FIG.5
PRIOR ART
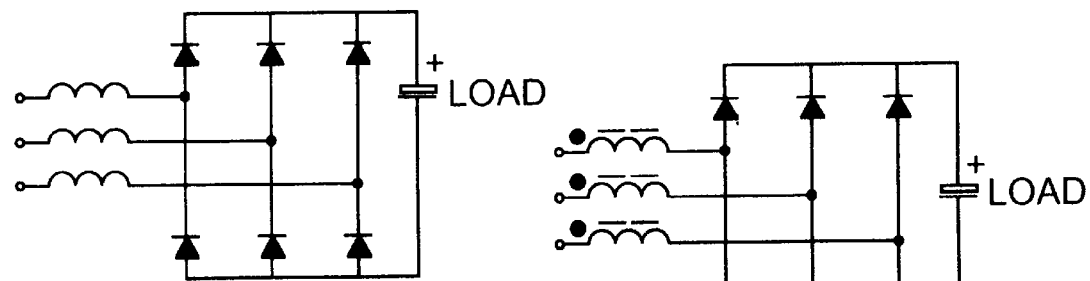
FIG.6A
PRIOR ART
FIG.6B
PRIOR ART

UNIVERSAL HARMONIC MITIGATING SYSTEM

FIELD OF INVENTION

This invention relates to harmonic mitigating devices for electrical power distribution systems. In particular, this invention relates to a solid state passive harmonic mitigating device for connection between the power distribution system and one or more harmonic-generating loads, to reduce the levels of harmonic currents flowing into the power distribution system.

BACKGROUND OF THE INVENTION

Electrical distribution systems, for example for distributing an electrical power supply through a building or industrial facility, are often subjected to harmonic currents generated by non-linear loads such as electronic equipment (including computers, adjustable speed drives (ASD), uninterruptable power supplies (UPS), power rectifiers, etc.) and equipment that uses different kinds of arc processes (including arc discharge lighting systems). These harmonic-generating loads generate various levels of conventional harmonics (5th, 7th, 11th, 13th, 17th, 19th, 23rd, 25th etc.) and, for single phase line-to-neutral non-linear loads, also zero phase sequence or "triplen" harmonics (3rd, 9th etc.) in the power distribution system, the harmonic spectrum depending upon the nature of the harmonic-generating load.

For example, FIG. 1 illustrates a typical current consumption waveform of a computer load at 60 Hz fundamental frequency, the accompanying table illustrating the distribution of harmonic currents present in the power distribution system as a percentage of the fundamental current. FIG. 2 illustrates a typical current consumption waveform of an ASD at 60 Hz, the accompanying graph illustrating the distribution of harmonic currents present in the power distribution system.

These harmonic currents create many problems in the power distribution system, including increased voltage total harmonic distortion level, reduced electromagnetic compatibility of the loads, reduced reliability of the power distribution equipment, increased power losses, reduced power factor, and other problems which are well known to those skilled in the art.

Prior art systems for mitigating harmonic currents fall into five basic types:

1. Power factor corrected (PFC) power supplies: In these systems the rectified current is continually adjusted to smooth the current consumption waveform. An example is illustrated in FIG. 3. PFC's are relatively expensive devices and their applications are limited. Also, PFC's cannot be retrofitted for use with existing power supplies, and are not practical for use with large ASD's.
2. Active filters: These devices inject into the conductors between the power distribution system and the load, harmonic currents having a polarity opposite to those generated by the load, thereby neutralizing harmonic currents flowing into the power distribution system. An example is illustrated in FIG. 4. Active filters have many disadvantages, including high cost, poor reliability and poor dynamic characteristics. Active filters also are not practical for use with large ASD's.
3. Resonant L-C filters: L-C filters are commonly used in power systems, tuned to different harmonic frequencies to mitigate specific harmonic currents. An example is illustrated in FIG. 5. These devices present many problems which are well known to those skilled in the art, including high cost, poor effectiveness in low voltage systems and the tendency to cause the system to operate with a leading power factor. Further, because L-C filters are non-directional they are easily overloaded by untreated harmonic currents generated by other harmonic sources connected to the power distribution system (for example in a neighboring facility), resulting in overloading and frequent failures of the filter's capacitor bank.
4. AC chokes: In this harmonic mitigating technique reactors are connected in series between the line and the load. An example is illustrated in FIG. 6a (without a core) and 6b (with a core). This technique is simple, reliable and relatively low cost, however it results in a high voltage drop across the reactors. To reduce the voltage drop one must reduce the choke reactance level, which commensurately reduces the effectiveness of the choke and substantially limits harmonic current mitigation.

The voltage can be boosted by connecting a capacitor bank between the load and the choke, as shown in FIG. 7, but this frequently causes the system to operate with a leading power factor (especially in the case of light loading). In this case, since the reactance of the reactor at harmonic frequencies is much higher than the reactance of the reactor at the fundamental frequency, a large portion of the harmonic currents drain to the neutral through the capacitor. The capacitor has a high reactance at the fundamental frequency. However, the voltage drop across the choke remains very high. Thus, large compensating capacitors must be connected between the load and the choke to boost the voltage, which substantially increases the size and cost of the system and causes the system to operate at increased voltage levels during light loading conditions.

5. Phase shifting systems: Different kinds of phase shifters are available which allow the creation of quasi-multiphase systems, reducing certain harmonic levels. Harmonic currents of targeted orders are cancelled or substantially reduced depending upon the selected degree of the phase shift. However, such systems are typically limited in terms of the number of harmonic orders which can be mitigated, and the degree of harmonic mitigation depends upon the extent to which harmonics produced by the various harmonic sources are identical and their phase shift angles.

SUMMARY OF THE INVENTION

The present invention overcomes these disadvantages by providing a harmonic mitigating device connected between the power distribution system and the load which provides a flux shifting multiple-winding reactor with a capacitor bank connected between the reactor windings. At least one reactive element comprising a line winding connected to a first line, for example a phase, is oriented in a first polarity on a core. This provides a high reactance to harmonic currents generated by the load and flowing toward the power distribution system. According to the invention at least one compensating winding is provided on the same core, interposed in the first line between the line winding and the load, but oriented in a polarity opposite to the polarity of the line winding. The opposing fluxes generated by the line winding and the compensating winding cancel to a desired extent, and the cancellation of fluxes reduces the through-reactance of the device (i.e. supply-to-load) and thus reduces the voltage drop across the device between the power system and the load.

An intermediate point in the first line between the line winding and the compensating winding is connected to another line, which may be a neutral or a different phase, through a cross-link circuit comprising a capacitor. The capacitor provides a high reactance to the fundamental current, while at the same time creating a lower reactance path for harmonic currents between the load and the neutral (or different phase). As a result a large portion of the harmonic currents flows through the cross-link, which offers a lower reactance at harmonic frequencies than the line winding, and thus penetration of harmonic currents into the power distribution system is substantially mitigated.

The flux cancellation reduces the through-reactance of the reactor, i.e. the reactance of the path between the power distribution system and the load, which accordingly reduces the voltage drop across the reactor (since voltage drop is proportional to reactance). At the same time, the line winding introduces a high reactance level between the cross-link circuit and the power distribution system, so harmonic currents are diverted through the cross-link circuit and are substantially eliminated from the system. This significantly decreases power losses in the power distribution system, which reduces energy usage, avoids overheating, decreases voltage distortion and improves the power factor. However, because the voltage drop across the device is substantially reduced by the cancellation of fluxes between the oppositely-directed line winding and compensating winding, the device of the invention eliminates the need for large capacitors to boost the voltage at the load, and also substantially reduces voltage fluctuations resulting from load changes.

Moreover, the reactor and the capacitor bank operate over a range of harmonic frequencies, and the device of the invention thus effectively operates as a wide band filter so that a single device can be used to mitigate multiple harmonic frequencies.

In the preferred embodiment the cross-link circuit also includes a winding disposed on the same core as the line winding, or optionally on a separate core, and connected in series with the capacitor in the same polarity as the line winding. This allows the frequency characteristics of the cross-link circuit to be selected as desired, providing an additional degree of freedom that allows the cross-link circuit reactance to be selected so as to more effectively divert harmonic currents of selected frequencies. Additional windings may be provided in the device of the invention, providing that in each case at least one compensating winding is provided between at least one line winding and the load, to cancel (partially or fully) the flux generated by the line winding and reduce the voltage drop across the device between the power supply and the load.

In a multi-phase system the compensating windings may be disposed on different core legs from the line windings to which they are respectively connected. This alters the reactance characteristics of the device, because the opposite fluxes generated by the line winding and its associated compensating winding will be out of phase, and at the same time changes the phase shift angle of the harmonic currents generated by a non-linear load. Also, in a multi-phase system the cross-link circuits of different phases can be interconnected to divert harmonic currents to a capacitor bank, with or without connection to a neutral.

These and other variations of the invention will become apparent from the description of the preferred embodiments which follows.

The present invention thus provides a harmonic mitigating device for mitigating harmonic currents generated by a load, comprising a magnetic core, a first reactive element comprising a line winding having a first end for connection to a first line and a second end, the line winding being disposed on the core in a first orientation, a second reactive element comprising a compensating winding having a first end for connection to the load and a second end, disposed on the core in a second orientation opposite to the first orientation, the second end of the compensating winding being connected to the first line through the line winding, and at least one cross-link circuit comprising a capacitor having an input connected to the first line at an intermediate point between the line winding and the compensating winding, and an output connected to a second line, wherein a reactance between the power distribution system and the load is reduced by a cancellation of fluxes generated by the line winding and the compensating winding, and a selected portion of the harmonic currents is diverted through the cross-link circuit.

The present invention further provides a harmonic mitigating device for mitigating harmonic currents generated by a load in a three phase power distribution system, comprising a magnetic core having at least three core legs, for at least one phase, a first reactive element comprising a line winding having a first end for connection to a first line of the power distribution system and a second end, the line winding being disposed on a leg of the core in a first orientation, a second reactive element comprising a compensating winding having a first end for connection to the load and a second end, disposed on the core in a second orientation opposite to the first orientation, the second end of the compensating winding being connected to the first line through the line winding, and at least one cross-link circuit comprising a capacitor having an input connected to the first line at an intermediate point between the line winding and the compensating winding, and an output connected to a second line of the power distribution system, wherein a reactance between the power distribution system and the load is reduced by a cancellation of fluxes generated by the line winding and the compensating winding, and a selected portion of the harmonic currents is diverted through the cross-link circuit.

The invention further provides a method of reducing a voltage drop across a line reactor in a first line of a power distribution system, the line reactor comprising a line winding disposed on a magnetic core and having a first end connected to the first line and a second end connected to the load, comprising the steps of connecting a compensating winding in series between the line winding and the load, the compensating winding being disposed on the core and oriented in a polarity opposite to the polarity of the line winding, connecting the input of a cross-link circuit comprising a capacitor to the first line at an intermediate point between the line winding and the compensating winding, and connecting the output of the cross-link circuit to a second line.

In a further aspect of the invention the magnetic core is provided with at least one non-magnetic gap.

Various additional line windings, compensating windings, cross-link circuits and/or cross-link windings may be provided or omitted as desired to improve the ability to target specific harmonic frequencies.

BRIEF DESCRIPTION OF THE DRAWINGS

In drawings which illustrate by way of example only a preferred embodiment of the invention.

FIG. 3 is a schematic illustration of a power distribution system utilizing a prior art power factor corrected (PFC) switch mode power supply;

FIG. 4 is a schematic illustration of a power distribution system utilizing a prior art active power filter;

FIG. 5 is a schematic illustration of a power distribution system utilizing a prior art L-C filter bank;

FIGS. 6a and 6b are schematic illustrations of a power distribution system utilizing a prior art line reactor (choke);

DETAILED DESCRIPTION OF THE INVENTION

Figure 1:
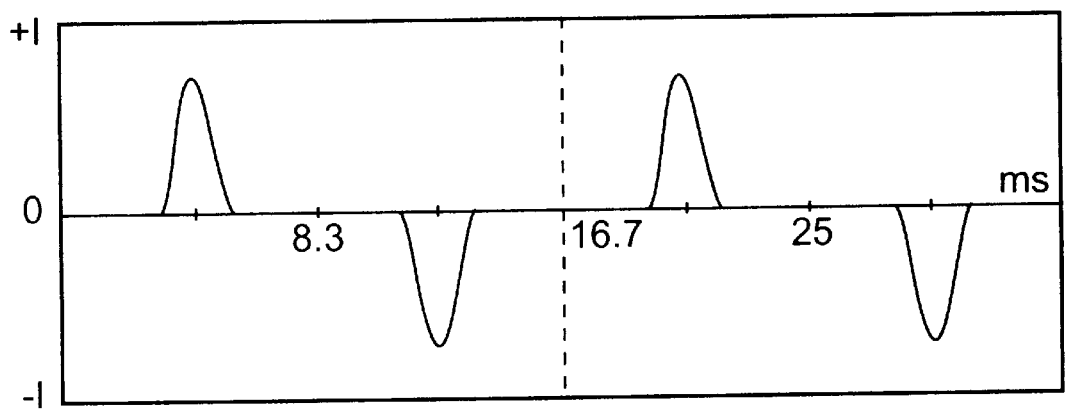
FIG. 1 is a graph showing the typical consumption current waveform and harmonic spectrum of a computer load.

In the embodiments of the invention illustrated, a power distribution system 2 may be any a.c. electrical power source, typically a mains power supply powered by an electrical utility or a local generator. The load 4 includes one or more harmonic-generating (non-linear) loads, the most common being non-linear loads such as computers, adjustable speed drives, rectifiers etc. The harmonic spectrum of different types of harmonic-generating loads will vary, however the device of the invention is suitable for mitigating harmonic currents in many different kinds of harmonic-generating loads.

According to the invention, harmonic currents generated by the load 4 are mitigated by interposing reactive elements in a first line 6 of the power distribution system, which may be a phase of the power distribution system 2 or a neutral, between the power distribution system 2 and the load 4, to establish a low reactance fundamental current path in the first line 6 between the load 4 and the power distribution system 2. The invention further provides a cross-link circuit connected to a second line 8, which if the first line 6 is a phase, may be a neutral or a different phase of the power distribution system 2, or if the first line 6 is a neutral, the second line 8 may be any phase of the power distribution system 2, to establish a low reactance path for harmonic currents generated by the load 4. Harmonic currents, which according to fundamental electrical principles will follow the path of lowest reactance, are thus largely diverted from the first line 6 through the cross-link circuit and do not penetrate into the power distribution system 2.

In the preferred embodiments of the invention this is accomplished by providing at least two windings disposed in opposite polarities on a core, connected in series in the first line 6 between the power supply and the load 4. The flux generated by one winding 20 is opposite to the flux generated by the other winding 30, resulting in a partial cancellation of fluxes. A cross-link circuit 40 is connected to a point between the two oppositely oriented windings 20, 30 and to the second line 8, to establish a low reactance path for harmonic currents generated by the load 4. The cross-link circuit includes a capacitor 44, which has a high reactance to the fundamental current, and in the preferred embodiment may also include a reactive element comprising a winding 42 on a core which allows the reactance of the cross-link circuit 40 to be selected so as to target specific harmonic frequencies or frequency ranges.

Thus, a significant portion of the harmonic currents can be diverted through the cross-link circuit 40. The frequency characteristics of the device of the invention are determined by the reactances of the windings and the capacitance of the capacitor, which also determine the output voltage level and the load displacement factor.

Figure 8:
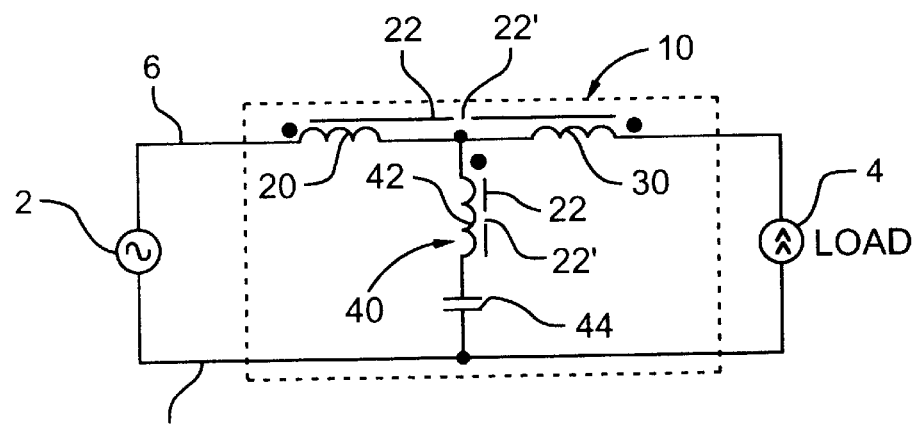
FIG. 8 is a schematic illustration of a single phase power distribution system utilizing one embodiment of the harmonic mitigating device of the invention.

FIG. 8 illustrates a first preferred embodiment of the invention for a single phase harmonic mitigating device. A fundamental current path between the power distribution system and the load 4 is established in the first line 6 through reactive elements disposed on a magnetic (typically ferrous) core 22. In this embodiment the reactive elements comprise a line winding 20 having a reactance $X_1$ and having a first end connected to the first line 6 between the power distribution system 2 and the load 4, and a compensating winding 30 having a reactance $X_2$ and connected in series between the load 4 and the line winding 20. The compensating winding 30 is oriented on the core 22 with an opposite polarity relative to the line winding 20, as illustrated by the dot symbol in the drawings which designates the start of the winding. The line winding 20 and the compensating winding 30 thus carry the load current from the power supply 2 through the first line 6 to the load 4.

The reactance of each winding 20, 30 is proportional to the square of the number of turns of the winding 20 or 30 wound on the core 22. Because the line winding 20 and the compensating winding 30 are oriented with opposite polarities their fluxes oppose one another and partially cancel.

A harmonic current path is established between the load 4 and the second line 8 by a cross-link circuit 40, which comprises a cross-link capacitor 44. In the preferred embodiment the cross-link circuit 40 further comprises a reactive element comprising cross-link winding 42 having a reactance $X_3$. The input of the cross-link circuit 40 is connected to the first line 6 at an intermediate point between the line winding 20 and the compensating winding 30, and the output of the cross-link circuit 40 is connected to the second line 8.

The reactance level of the harmonic current path established between the first line 6 and the second line 8, i.e. the reactance $X_{CL}$ of the cross-link circuit 40 (referred to herein as the "cross-link reactance"), is proportional to the inductive reactance $X_3$ of the winding 42 minus the capacitive reactance $X_C$ of the capacitor 44..

The flux generated by the line winding 20 is proportional to the ampere turns $I_L * N_L$ of the winding 20, which is equal to the product of the current of the winding 20 and the number of turns of the winding 20. Likewise the flux generated by the compensating winding 30 is proportional to the ampere turns $I_C * N_C$ of the winding 30, which is equal to the product of the current of the winding 30 and the number of turns of the winding 30. Typically the line winding current $I_L$ is slightly lower than the compensating winding current $I_C$. The difference is due to reduced reactive current in the line winding 20 as a result of the cross-link capacitor reactive power compensating effect and the reduced level of harmonic currents at the line winding 20 because of their diversion through the cross-link circuit 40.

For the fundamental fluxes the residual flux will be determined by the difference between the fundamental ampere-turns of the line winding 20 and the fundamental ampere-turns of the compensating winding 30. The through-inductance of the windings 20 and 30 is $L=L_L+L_C-2M$, where $L_L$ is the inductance of the line winding 20, $L_C$ is the inductance of the compensating winding 30, and M is the mutual inductance between the windings 20, 30. The total through-inductance of the device 10 (referred to herein as the supply-to-load inductance) is determined by taking into account also the inductance of the cross-link circuit 40.

The reactances of the reactive elements are preferably selected so that $X_1>X_2$ and $X_1>X_3$. Harmonic currents flowing from the load 4 to the power distribution system 2 must flow through either the line winding 20 or the cross-link circuit 40. At the frequencies of the targeted harmonic currents the reactance $X_1$ of the line winding 20 is significantly greater than the reactance $X_{CL}$ of the cross-link circuit 40. A large portion of the harmonic currents will therefore flow through the cross-link circuit 40.

The ratio between the reactance $X_3$ of the cross-link winding 42 and the reactance $X_C$ of the capacitor determines the frequency characteristics of the cross-link circuit 40. The device 10 can thus be designed to mitigate certain harmonic currents in preference to others. Although as illustrated the input of the cross-link winding 42 is connected to the first line 6 and the output of the cross-link capacitor 44 is connected to the second line 8, those skilled in the art will appreciate that the relative positions of the winding 42 and capacitor 44 in the cross-link circuit 40 are interchangeable.

The reactances $X_1$, $X_2$ and $X_3$ may be selected within a wide range. Typically the cross-link reactance $X_{CL}$ will be significantly lower than the line winding reactance $X_1$ at the selected harmonic frequencies, ensuring that most of the harmonic currents are diverted through the cross-link circuit 40.

In operation, the fundamental current flows from the power distribution system 2 through the first line 6 to the load 4. The fundamental current flows through line winding 20 and compensating winding 30 with relatively low through-reactance because of the flux cancellation between the line winding 20 and the compensating winding 30, and thus powers the load 4 with low voltage drop through the device 10.

Harmonic currents generated by non-linear loads 4 flow toward the power distribution system 2 through the compensating winding 30 to the second end of the line winding 20. From this point the reactance $X_{CL}$ through cross-link circuit 40, which is a function of $X_3-X_C$, is significantly lower than the reactance $X_1$ of the line winding 20. Thus, at the output of the line winding 20 harmonic currents are diverted from the first line 6 through the cross-link circuit 40 to the second line 8 (which is the neutral in the embodiment shown). The ratio of harmonic currents diverted through the cross-link circuit 40 to harmonic currents flowing through the first line 6 to the power supply 2 is inversely proportional to the ratio of the cross-link reactance $X_{CL}$ (i.e. $X_3-X_C$) to the reactance of the line winding 20 ($X_1$) at any particular harmonic frequency. Accordingly, only residual levels of the harmonic currents flow into the power distribution system 2; with the appropriate values for $X_1$, $X_2$, $X_3$ and $X_C$, typically 80% to 90% or more of the harmonic currents will be diverted through the cross-link circuit 40.

The degree to which harmonic currents are mitigated can thus be selected by controlling the reactance levels of the windings 20, 30, 42 and the capacitor 44. This largely determines the extent to which the reactance level of the winding $X_1$ to the harmonic currents exceeds the reactance level of the harmonic current path through the cross-link circuit 40 at selected harmonic frequencies.

Thus, the reactance characteristics, number and arrangement of reactive elements can be selected to reduce the level of harmonic currents over a wide range, from a slight reduction to virtually complete reduction of most harmful harmonics, according to the desired application. The device 10 of the invention can target minimization of a single harmonic current level or the current total harmonic distortion level.

Through experimentation and/or computer modeling, the harmonic spectrum in the power distribution system can be controlled by selecting the reactance of cross-link winding 42 and the capacitance of cross-link capacitor 44 to mitigate certain harmonic frequencies in preference to other harmonic frequencies, depending upon the harmonic spectrum of the load 4 and requirements of the system. In any particular case this selection may take into account such factors as voltage drop, total harmonic distortion level, power factor and d.c. voltage pulsation level at the rectifier output.

The cross-link circuit 40 is separated from the power system by a high reactance of winding 20, which is beneficial because it reduces the possibility of overload of the windings and capacitors by untreated harmonic currents generated by non-linear loads connected to the power distribution system at other locations. The level of the supply-to-neutral reactance ($X_1+X_3-X_C$) should be selected so as to prevent any resonance conditions of the capacitor 44 with the power system reactances.

The ferrous core 22 should preferably be provided with at least one non-magnetic gap 22', since the magnetic characteristics of ferrous materials are nonlinear and vary widely with the load current. With a completely solid ferrous core it would be virtually impossible to control the reactance characteristics of the device 10, because reactance would change drastically as the load current changes. The optimal gap size changes depending upon the rating of the device, influenced primarily by the cross-section of the core and the number of turns of the windings. For example, in a reactor rated at 150 horsepower, each non- magnetic gap 22' should preferably be approximately 3 mm. The gap 22' also allows for large levels of power flow to be conducted through the reactor.

The invention also serves to reduce voltage pulsation levels in rectifier outputs (such as in ASD's) more effectively. The capacitor 44 can buffer transient overvoltages, and the use of the device 10 increases ride through time of the system during momentary voltage dips.

Figure 9:
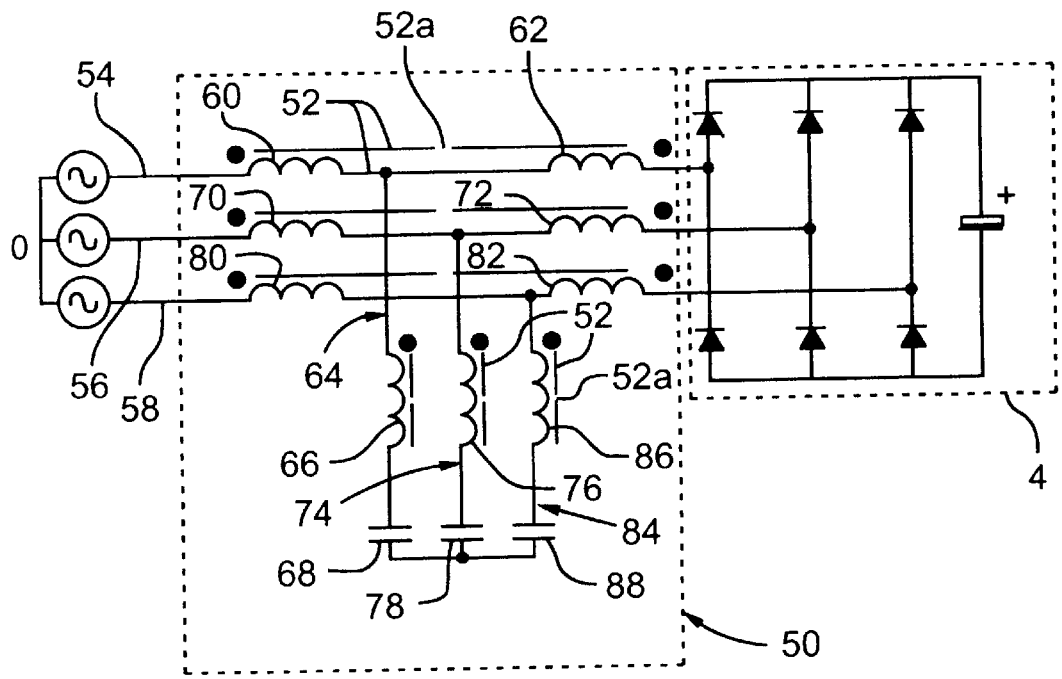
FIG. 9 is a schematic illustration of a three phase power distribution system utilizing an embodiment of the harmonic mitigating device having cross-link capacitors connected in a wye configuration.

FIG. 9 illustrates a three phase embodiment of a harmonic mitigating device of the invention. A three phase reactor 50 on a core 52 comprises line windings 60, 70, 80 each having its input connected to one line 54, 56, 58 from the power distribution system, and its output connected in series to the inputs of respective compensating windings 62, 72, 82. The compensating windings 62, 72, 82 have their outputs respectively connected to the three phase inputs of rectifier 59 (as shown in the drawings, the rectifier 59 actually forms part of the load 4, since the "load" should be considered to include any electrical system downstream of the device 50).

In accordance with the invention the compensating windings 62, 72, 82 are oriented on the core 52 in a polarity opposite to the polarity of the line windings 60, 70, 80. Cross-link circuits 64, 74, 84 are each respectively connected to the first line (i.e. line 54, 56 or 58) at the outputs of the line windings 60, 70, 80. Cross-link circuits 64, 74, 84 respectively comprise cross-link windings 66, 76, 86 connected in series to capacitors 68, 78, 88, the outputs of which are interconnected in a wye configuration and optionally connected to a system neutral N if mitigation of zero phase sequence harmonics is desired.

The operation of this embodiment is the same as the operation of the single phase embodiment of the invention illustrated in FIG. 8, with harmonic currents in each phase being diverted through the lower reactance paths formed by the cross-link circuit 64, 74 or 84. As in the single phase embodiment, the positions of the windings 66, 76, 86 and the capacitors 68, 78, 88 within each respective cross-link circuit 64, 74, 84 are interchangeable.

Figure 10:
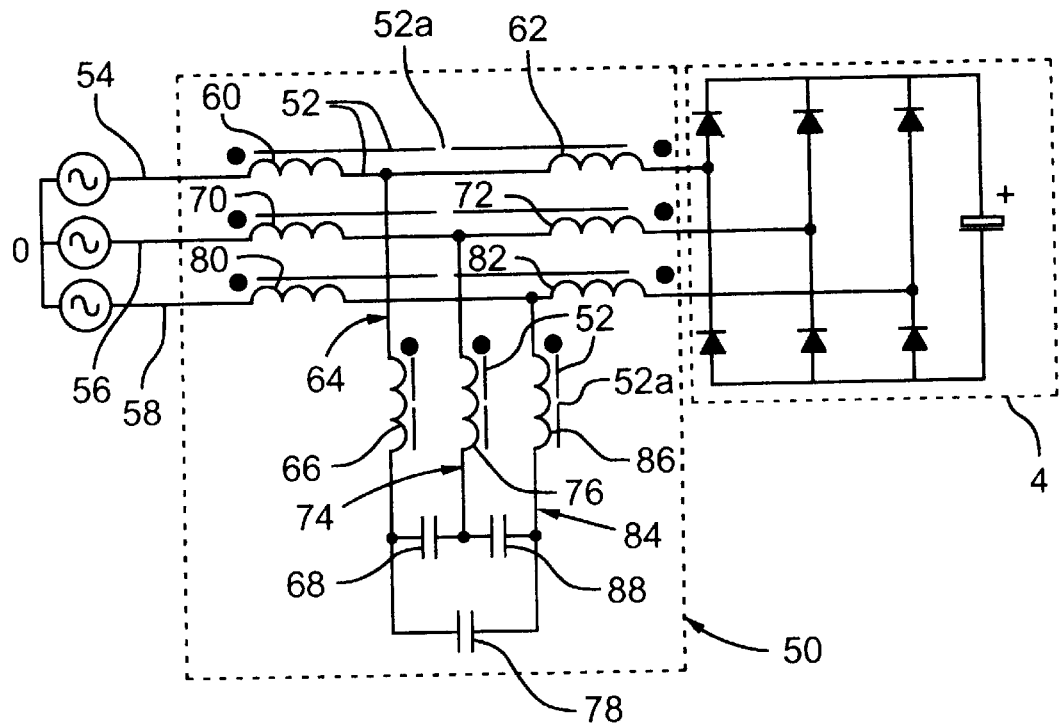
FIG. 10 is a schematic illustration of a three phase power distribution system utilizing a further embodiment of the harmonic mitigating device having cross-link capacitors connected in a delta configuration.

If mitigation of zero phase sequence harmonics is not required, then the cross-link circuits 64, 74, 84 do not need to be connected to the neutral. FIG. 10 illustrates a further three phase embodiment of the harmonic mitigating device 50 of the invention, similar to the embodiment of FIG. 9 except that the outputs of the cross-link windings 66, 76, 86 are interconnected through a capacitor network 90 comprising capacitors 92, 94, 96 connected in a delta configuration. As in the previous embodiments the harmonic currents are diverted through the cross-link circuits 64, 74, 84 due to the lower reactance of $X_3-X_C$ relative to $X_1$.

In each case the windings are disposed on the legs of a core 52 having at least one non-ferrous gap 52a in each core leg. Alternatively, two independent cores positioned in alignment and separated by a non-ferrous gap would effectively create a single magnetic system.

In the three phase embodiment the compensating windings 62, 72, 82 need not necessarily be disposed on the same leg as the line windings 60, 70, 80 to which they are connected; they may be disposed on other core legs and/or connected to other windings from other phases, although in this case the flux canceling effect of the compensating windings 62, 72, 82 would be reduced somewhat because of the phase difference between the line windings 60, 70, 80 and the compensating windings 62, 72, 82. At the same time, it may be advantageous in certain cases to locate the compensating windings 62, 72, 82 on core legs that do not correspond to the core legs on which the respectively connected line windings 60, 70, 80 are disposed, as this will phase shift the fluxes generated thereby. FIGS. 14a to 14i illustrate examples of available interconnections between the line windings 60, 70, 80 and the compensating windings 62, 72, 82 in three phase embodiments of the invention mounted on a core 52.

The three phase embodiments of FIGS. 9 and 10 may be more convenient and cost-effective because the device 50 has a single core. However, another equally viable alternative in a three phase system, or any multi-phase system, is to use a plurality of single phase devices as described above, one interposed in each phase. The outputs of the cross-link circuits 40 may interconnected such that the cross-link capacitors 44 are connected in a wye configuration, as in the embodiment of FIG. 9, in which case the interconnected cross-link circuit outputs may optionally be connected to the neutral, or in a delta configuration as illustrated in FIG. 10.

The first line 6 may be any phase in the system or the neutral. Where the first line 6 is a phase the second line 8 may be any other phase or the neutral, or where the first line 6 is the neutral the second line 8 any be any phase.

Figure 11:
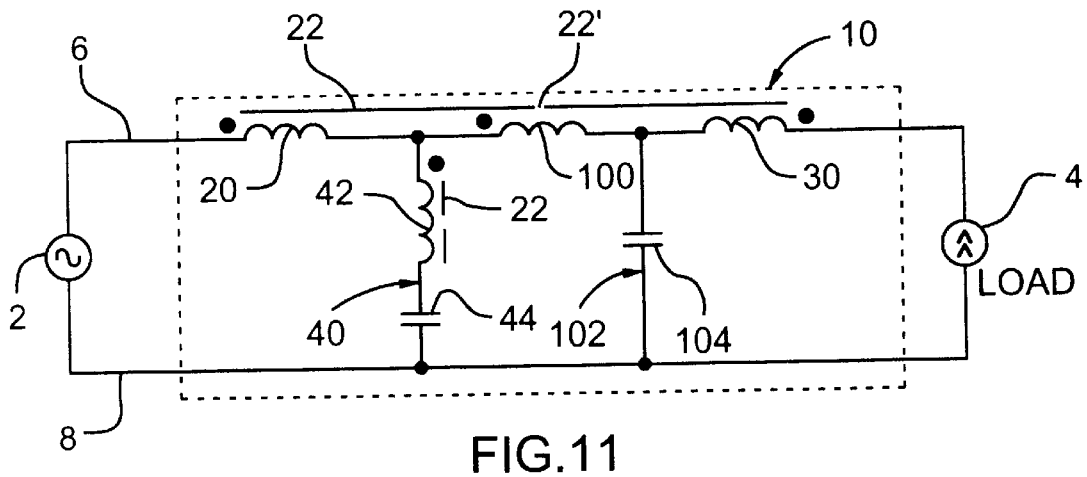
FIG. 11 is a schematic illustration of a single phase power distribution system utilizing a further embodiment of the harmonic mitigating device of the invention.
Figure 12:
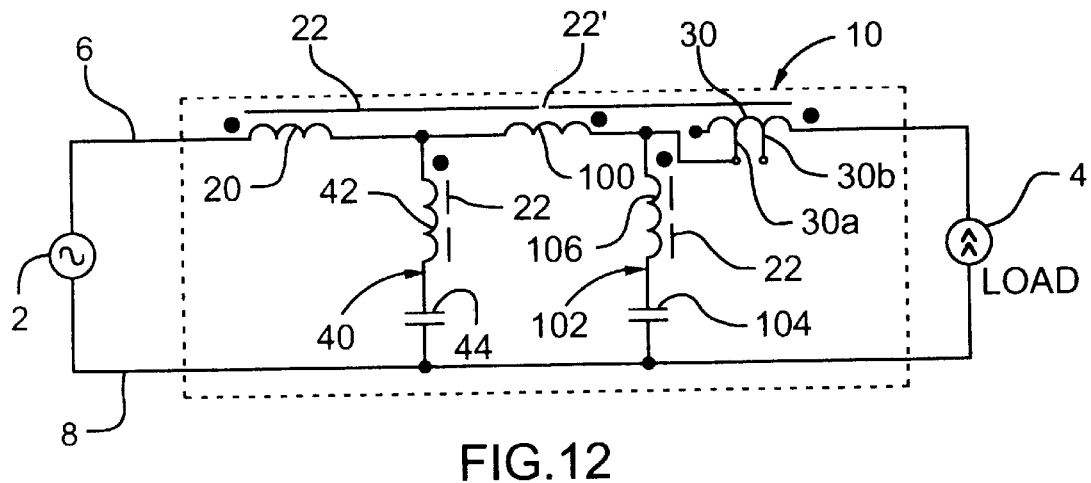
FIG. 12 is a schematic illustration of a variation of the embodiment of FIG. 11, FIGS. 13a to 13c are schematic illustrations of alternative single phase embodiments of the harmonic mitigating device of the invention.

FIGS. 11 and 12 illustrate further preferred embodiments of the invention for a single phase power distribution system 2. The fundamental current path is established through the device 10 by a first line winding 20 having a reactance $X_1$ disposed in the first line 6 between the power distribution system 2 and the load 4, and a compensating winding 30 having a reactance $X_2$ and connected in series between the first winding 20 and the load 4. The compensating winding 30 is oriented with a polarity opposite to the polarity of the first line winding 20. A harmonic current path is established by first cross-link circuit 40 comprising cross-link winding 42 having a reactance $X_3$ and a cross-link capacitor 44.

As in the previous embodiments the input of the first cross-link circuit 40 is connected to the output of the first line winding, and the output of the first cross-link circuit 40 is connected to the neutral N (or to a different phase). However, in this embodiment a second line winding 100 is connected between the first line winding 20 and the compensating winding 30. A second cross-link circuit 102 comprising cross-link capacitor 104 is connected to the output of the second line winding 100 and the neutral N (or to a different phase). The current ratio between the three windings 20, 30, 100 is in part dependent upon the level and spectral distribution of harmonic currents generated by the load 4. Thus, the addition of cross-link circuit 102 with capacitor 104 increases the harmonic mitigating frequency range of the device 10, to further reduce the total level of harmonic currents flowing into the power distribution system 2. Moreover, the second cross-link circuit 100 can be tuned to have a very low reactance to a specific harmonic frequency, to thus preferentially target that harmonic frequency without detracting from the mitigation of several other orders of harmonics through the first cross-link circuit 40.

To reduce the voltage drop across the device 10, the reactances of the windings 20, 30, 100 are selected so that the combined fluxes of the first and second line windings 20, 100 is partially reduced or substantially cancelled by the flux generated by the oppositely-oriented compensating winding 30, as desired for any particular application.

In the embodiment shown in FIG. 11 the second line winding 100 is oriented in the same polarity as the first line winding 20. It is also possible to orient the second line winding 100 in a polarity opposite to the first line winding 20, as shown in FIG. 12, in which case the winding 100 becomes a second compensating winding and its reactance is additive to the compensating winding 30. In each case the selection of winding reactances should take into account the differential harmonic current distribution between the first line 6, the cross-link circuit 40 and the cross-link circuit 102.

Unlike the embodiment of FIG. 8, in which the input of the compensating winding is connected directly to the output of the line winding 20, in the embodiments of FIGS. 11 and 12 the compensating winding 30 is connected indirectly to the line winding 20, through the additional winding 100. It is possible to interpose further windings between the line winding 20 and the compensating winding 30, and in each case the input of the compensating winding would be connected indirectly to the output of the line winding 20 so that the fundamental current has a path from the power distribution system 2 through the first line 6 to the load 4. System optimization analysis for any particular system may show that some of these windings are superfluous.

The embodiment of FIG. 12 also shows the device 10 of the invention with taps 30a, 30b provided in the compensating winding 30. This allows the degree of flux cancellation to be varied according to the system requirements, by connecting the load 4 or the first line 6 to the tap 30a, 30b which provides the desired number of ampere-turns for the degree of flux cancellation desired. The line winding 20 and other windings 42, 100, 106 etc. may optionally be provided with taps to provide this additional versatility.

Figure 13A:
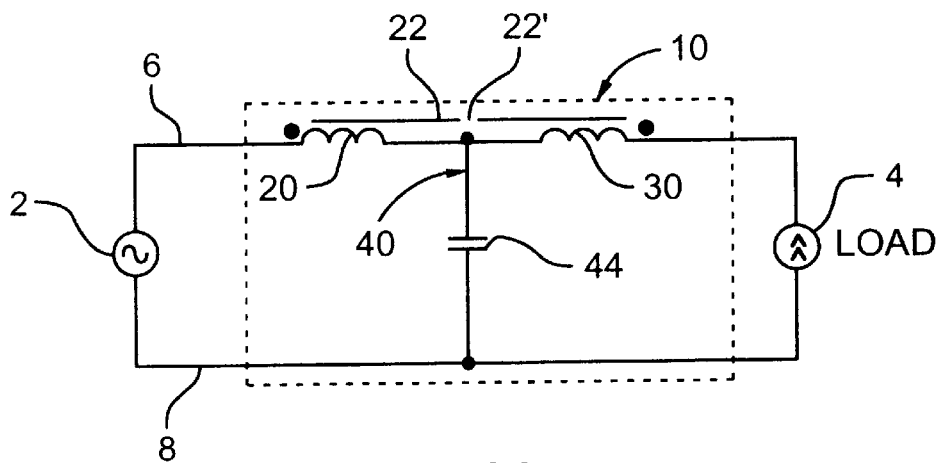
Figure 13B:
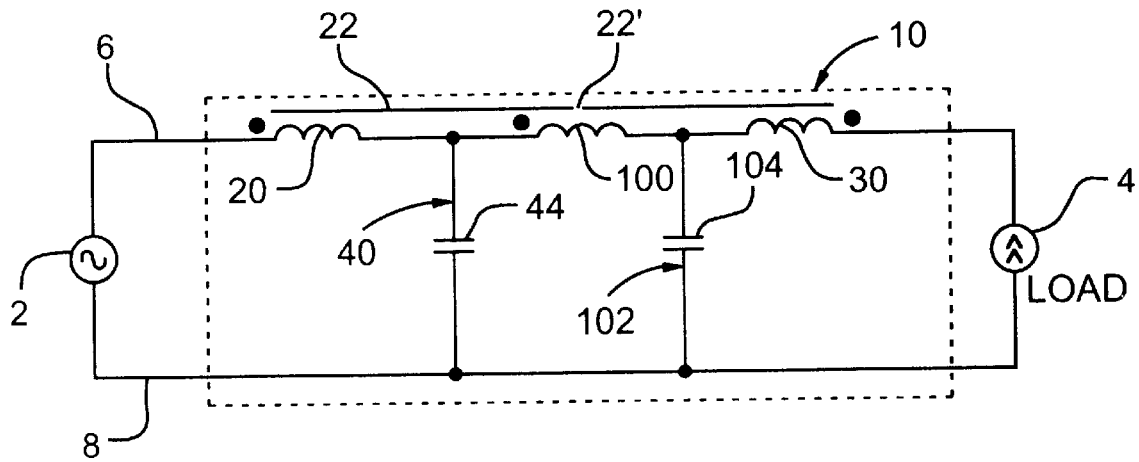
Figure 13C:
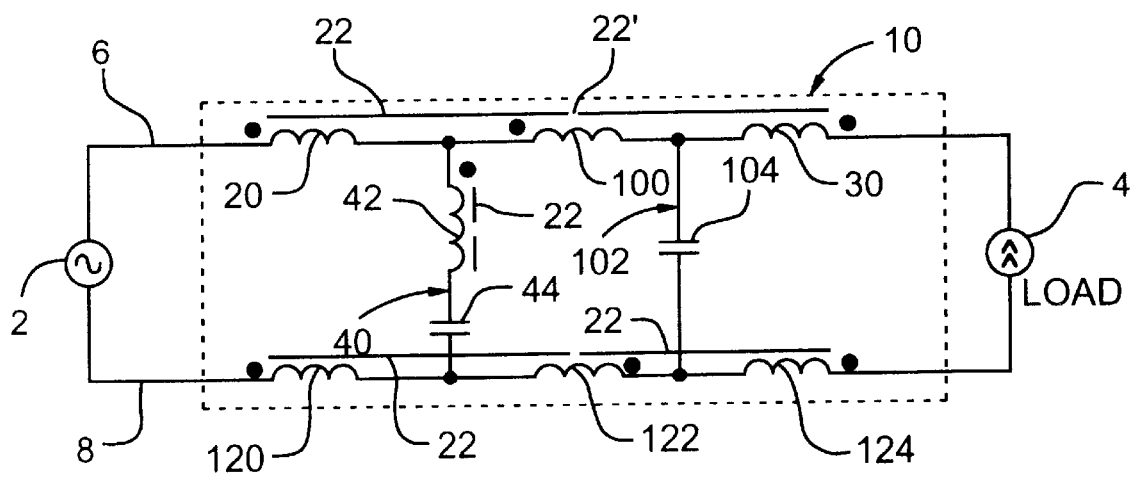
Figure 14A:
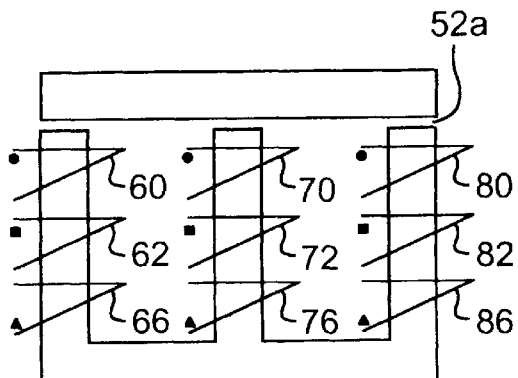
FIGS. 14a to 14i are schematic illustrations of various configurations of winding connections available in three phase embodiments of the harmonic mitigating device of the invention.
Figure 14B:
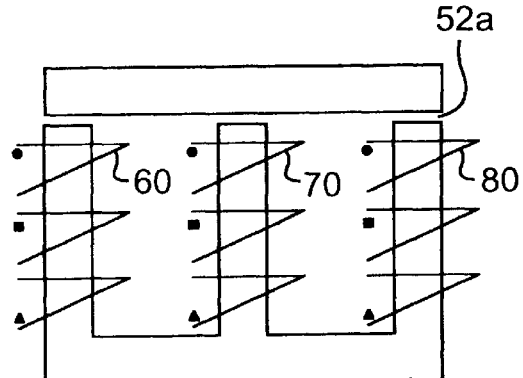
Figure 14C:
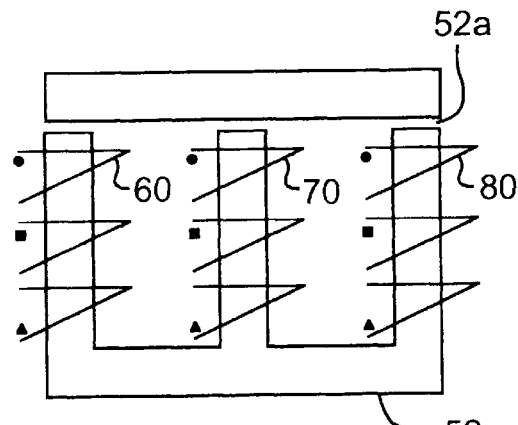
Figure 14D:
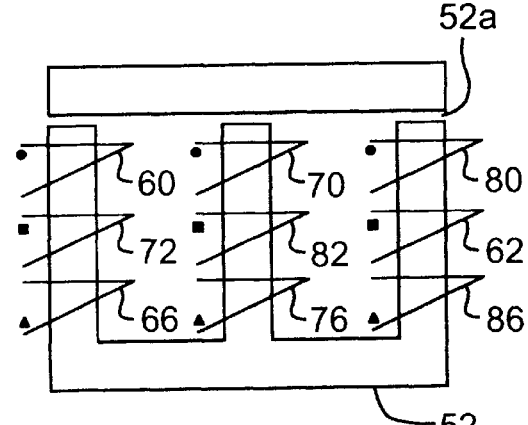
Figure 14E:
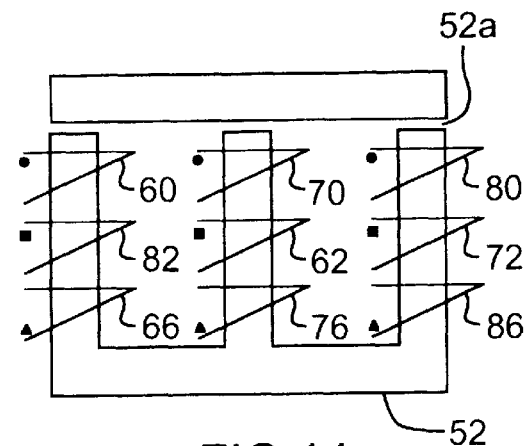
Figure 14F:
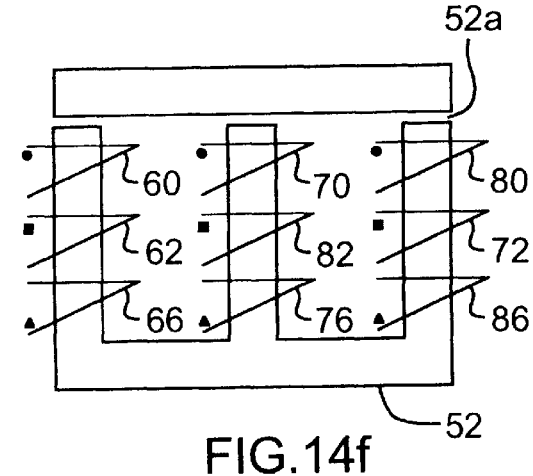
Figure 14G:
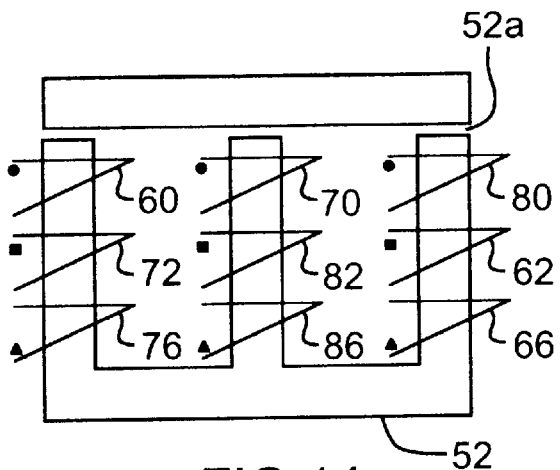
Figure 14H:
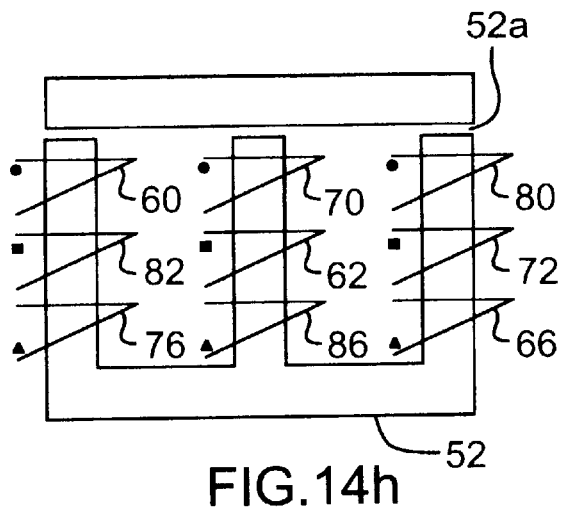
Figure 14I:
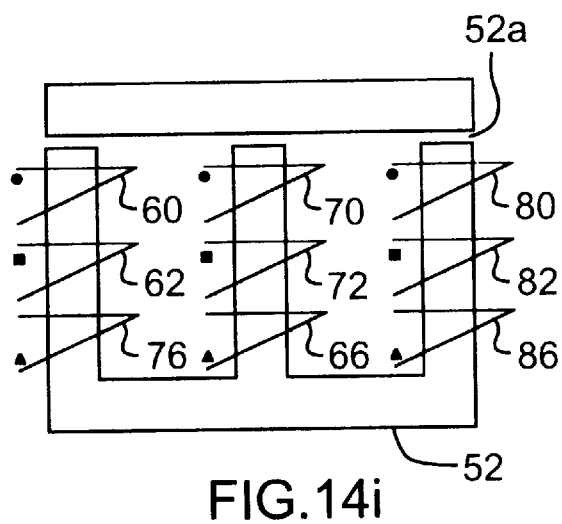

FIGS. 13a to 13c illustrate embodiments of the invention in which the cross-link circuits 40, 102 optionally exclude the cross-link windings 42 and/or 102, respectively.

In the embodiment of FIG. 13a, to harmonic currents the cross-link reactance $X_{CL}$ (in this case equal to the reactance $X_C$) remains lower than the reactance $X_1$ because of the low reactance $X_C$ of the cross-link capacitor 44 at harmonic frequencies. Because of the cancellation of fluxes between the magnetic fields generated by the first line winding 20 and the compensating winding 30 the overall voltage drop across the device 10 is reduced. However, the absence of a reactive element (winding 42) in the cross-link circuit 40 substantially diminishes the ability to selectively mitigate specific harmonic frequencies over other harmonic frequencies.

FIG. 13b illustrates a similar embodiment having a second line winding 100 and a second cross-link circuit 102. This somewhat improves the ability to selectively mitigate specific harmonic frequencies over other harmonic frequencies, because the capacitors 44, 104 can be selected to target more than one specific harmonic order. FIG. 13c illustrates an embodiment of the invention in which the ability to target specific harmonics is significantly improved by the inclusion of a cross-link winding 42 in the cross-link circuit 40. A cross-link winding could also be included if desired in the second cross-link circuit 102 (for example, as in the embodiment of FIG. 12). The line and compensating windings could be distributed between a phase and the neutral, or between phases, and the number of permutations and combinations is unlimited. These embodiments are equally applicable to multi-phase systems.

The cross-link winding 42 or 106 can be on the same core 22 as the line and compensating windings 20, 30, or may be on a different core. In the three phase embodiments the cross-link windings 66, 76, 86 may be on the same core 52 but disposed on different legs of the core 52 from the corresponding line windings 60, 70, 80, just as corresponding line and compensating windings 60 and 62, 70 and 72 or 80 and 82 may be on different core legs. FIGS. 14a to i illustrate schematically some variations available in a three phase embodiment of the invention having one line winding 60, 70, 80 on each leg; one compensating winding 62, 72, 82 on each leg; and one cross-link winding 66, 76, 86 on each leg. The dot symbol designates the winding input in each case.

Figure 15:
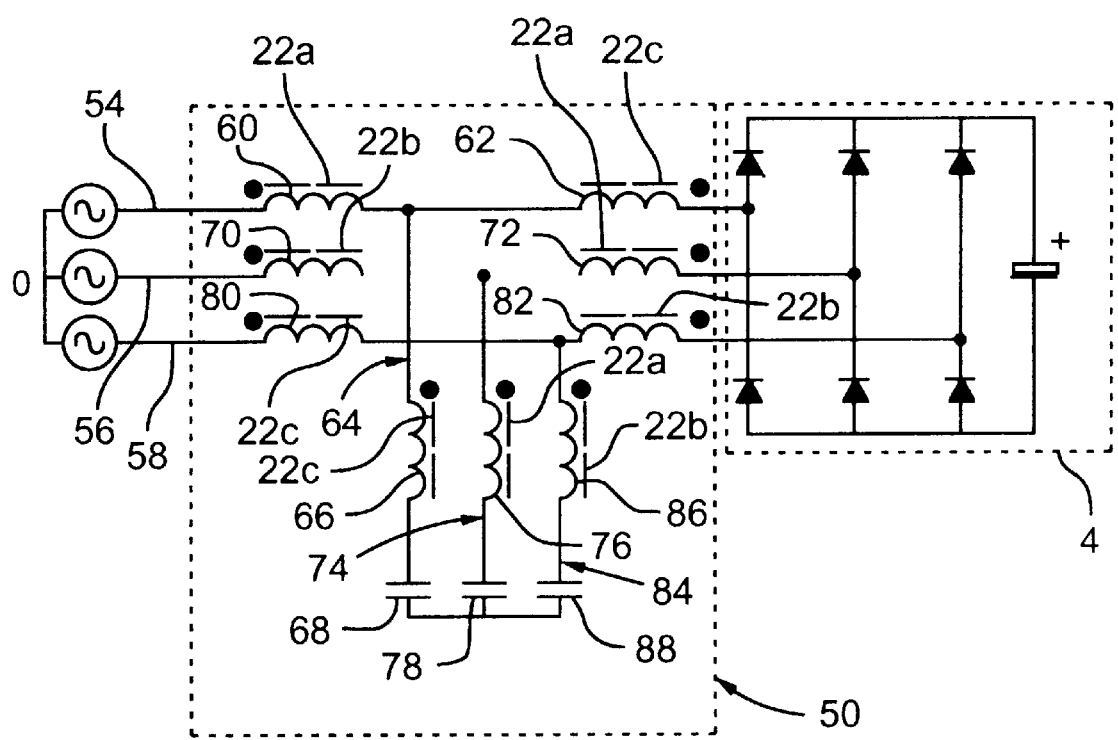
FIG. 15 is a schematic illustration of a further embodiment of the invention for a three phase system using three independent cores.

FIG. 15 illustrates an embodiment of the invention for a three phase system in which the line windings 60, 70, 80 and compensating windings 62, 72, 82 are disposed on separate cores 22a, 22b, 22c. It can be seen in this embodiment that the compensating winding 62, 72 or 82 does not need to be disposed on the same core as the line winding 60, 70, 80 to which it is connected. For example, the line winding 60 on core 22a is connected to the compensating winding 62 disposed on core 22c; the line winding 70 on core 22b is connected to the compensating winding 72 disposed on core 22a; and the line winding 80 on core 22c is connected to the compensating winding 82 disposed on core 22b. The invention nevertheless provides the desired cancellation of fluxes between line and compensating windings on the same core, i.e. 60, 72; 70, 82; and 80, 62; respectively.

Figure 2A:
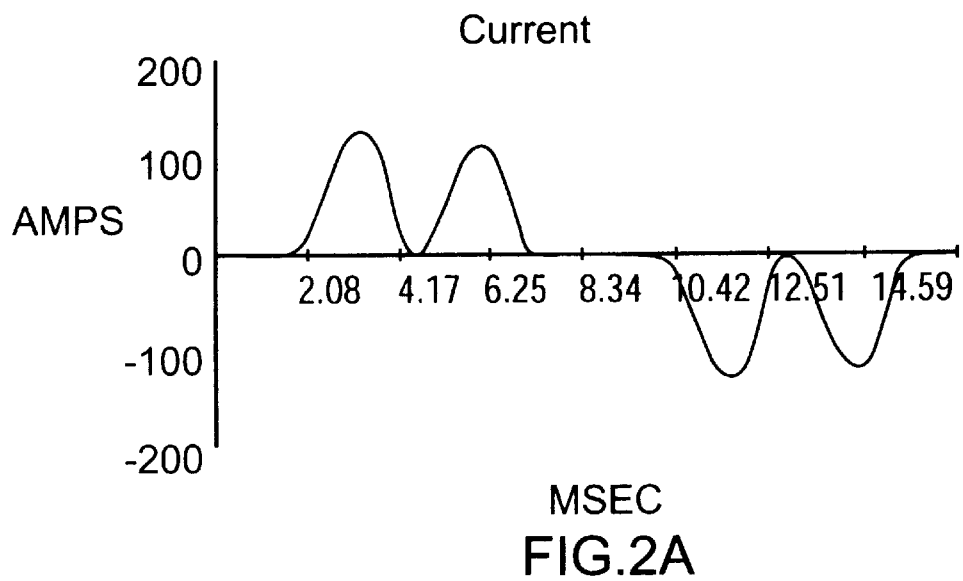
FIG. 2 is a graph showing the typical consumption current waveform and harmonic spectrum of an adjustable speed drive (ASD)
Figure 2B:
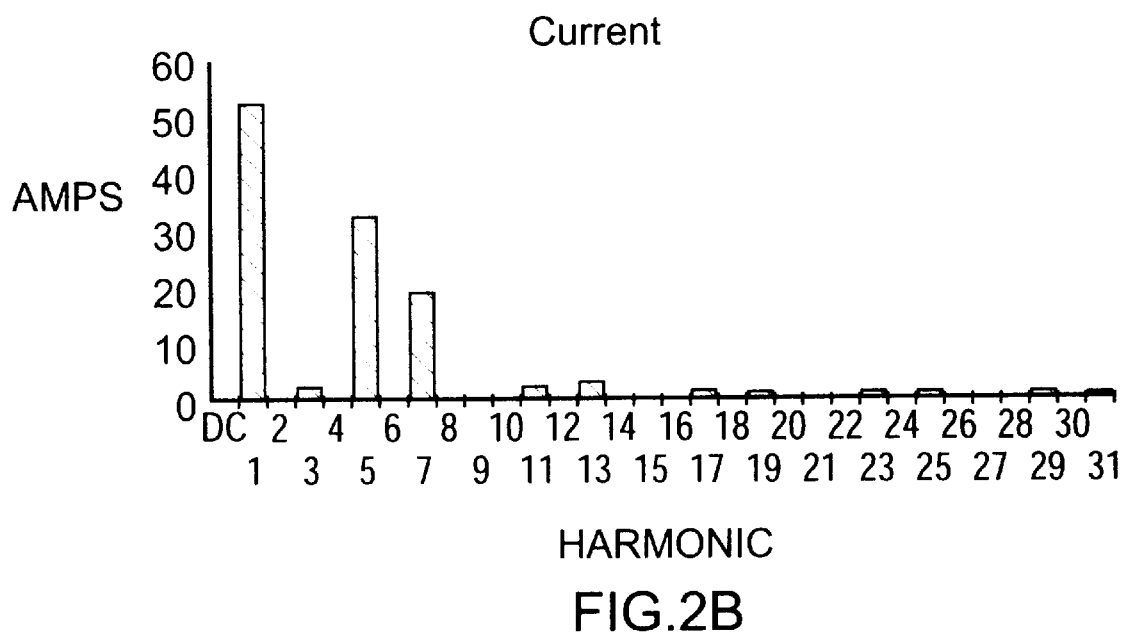
Figure 7:
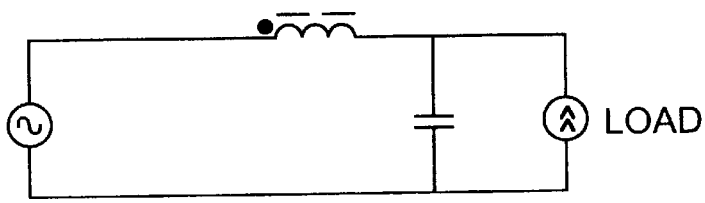
FIG. 7 is a schematic illustration of a power distribution system utilizing a variation of the line reactor of FIG. 6b.
Figure 16:
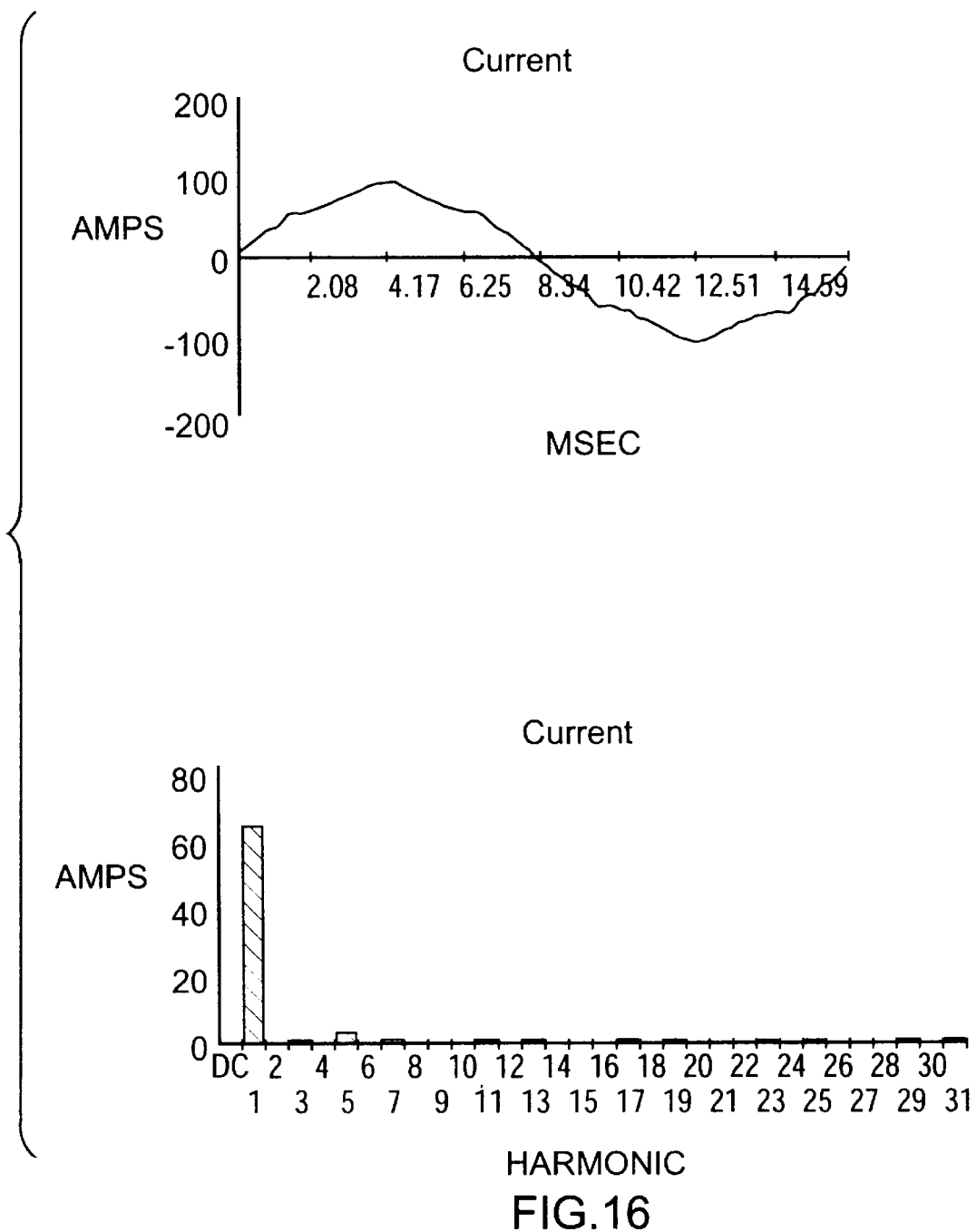
FIG. 16 is a graph showing the harmonic spectrum of the 60 horsepower ASD featured in FIG. 2 utilizing the harmonic mitigating device of FIG. 10.

FIG. 16 illustrates experimental results of current and the harmonic spectrum of the same 60 horsepower ASD that generated the waveform and harmonic spectrum shown in FIG. 2, but in FIG. 16 the harmonic mitigating device of FIG. 10 was used in the manner described above. As can be seen the harmonic current levels are substantially mitigated by the device 10 of the invention, and the consumption current waveform is restored to a waveform close to that of the fundamental.

The invention having thus been described with reference to the preferred embodiments, it will be apparent to those skilled in the art that certain modifications and adaptations may be made without departing from the scope of invention. The invention is intended to include all such modifications and adaptations as fall within the scope of the appended claims.

We claim:

1. A harmonic mitigating device for mitigating harmonic currents generated by a load connected to a power distribution system, comprising
   a magnetic core,
   a first reactive element comprising a line winding having a first end for connection to a first line and a second end, the line winding being disposed on the core in a first orientation,
   a second reactive element comprising a compensating winding having a first end for connection to the load and a second end, disposed on the core in a second orientation opposite to the first orientation, the second end of the compensating winding being connected to the first line through the line winding, and
   at least one cross-link circuit comprising a capacitor having an input connected to the first line at an intermediate point between the line winding and the compensating winding, and an output connected to a second line,
   wherein a reactance between the power distribution system and the load is reduced by a cancellation of fluxes generated by the line winding and the compensating winding, and a selected portion of the harmonic currents is diverted through the cross-link circuit.

2. The device of claim 1 in which the core is provided with at least one non-magnetic gap.

3. The device of claim 2 for a three phase power distribution system, having a plurality of line windings and a plurality of compensating windings disposed on legs of at least one magnetic core, comprising a plurality of cross-link circuits each comprising at least one capacitor.

4. The device of claim 3 in which the capacitors are connected in a delta configuration.

5. The device of claim 3 in which the capacitors are connected in a wye configuration.

6. The device of claim 5 in which outputs of the cross-link circuits are connected to a neutral.

7. The device of claim 2 in which the cross-link circuit comprises at least one winding disposed on a core and connected in series with the capacitor.

8. The device of claim 2 comprising a plurality of cross-link circuits.

9. The device of claim 8 in which at least one cross-link circuit comprises a winding disposed on a core and connected in series with the capacitor in said at least one cross-link circuit.

10. The device of claim 8 in which each cross-link circuit comprises a winding disposed on the core and connected in series with the capacitor.

11. The device of claim 2 comprising a plurality of line windings connected in series and oriented in a like polarity on the core.

12. The device of claim 2 comprising a plurality of compensating windings connected in series and oriented in a like polarity on the core.

13. The device of claim 7 in which a reactance of the line winding is greater than a reactance of the compensating winding.

14. The device of claim 13 in which a reactance of the compensating winding is approximately equal to a reactance of the winding in the cross-link circuit.

15. A harmonic mitigating device for mitigating harmonic currents generated by a load in a three phase power distribution system, comprising a magnetic core having at least three core legs, for at least one phase, a first reactive element comprising a line winding having a first end for connection to a first line of the power distribution system and a second end, the line winding being disposed on a leg of the core in a first orientation, a second reactive element comprising a compensating winding having a first end for connection to the load and a second end, disposed on the core in a second orientation opposite to the first orientation, the second end of the compensating winding being connected to the first line through the line winding, and at least one cross-link circuit comprising a capacitor having an input connected to the first line at an intermediate point between the line winding and the compensating winding, and an output connected to a second line of the power distribution system, wherein a reactance between the power distribution system and the load is reduced by a cancellation of fluxes generated by the line winding and the compensating winding, and a selected portion of the harmonic currents is diverted through the cross-link circuit.

16. The device of claim 15 in which the core is provided with at least one non-magnetic gap.

17. The device of claim 16 in which each leg of the core is provided with a line winding and a compensating winding, and between each line winding and each compensating winding a cross-link circuit comprising a capacitor has an input connected to the phase and an output connected to a line comprising a neutral conductor or a different phase of the power distribution system.

18. The device of claim 17 in which the capacitors are connected in a delta configuration.

19. The device of claim 17 in which outputs of the capacitors are connected in a wye configuration.

20. The device of claim 19 in which the outputs of the cross-link circuits are connected to the neutral.

21. The device of claim 17 in which the line winding is disposed on a different leg of the core from the compensating winding connected thereto.

22. The device of claim 16 in which the cross-link circuit comprises a winding disposed on a core and connected in series with the capacitor.

23. The device of claim 16 comprising a plurality of cross-link circuits having inputs connected between the at least one line winding and the compensating winding.

24. The device of claim 23 in which at least one cross-link circuit comprises a winding disposed on a core and connected in series with the capacitor in said at least one cross-link circuit.

25. The device of claim 16 comprising a plurality of line windings connected in series and oriented in a like polarity on the core.

26. The device of claim 16 comprising a plurality of compensating windings connected in series and oriented in a like polarity on the core.

27. A method of reducing a voltage drop across a line reactor in a first line of a power distribution system, the line reactor comprising a line winding disposed on a magnetic core and having a first end connected to the first line and a second end connected to the load, comprising the steps of a) connecting a compensating winding in series between the second end of the line winding and the load, the compensating winding being disposed on the core and oriented in a polarity opposite to the polarity of the line winding, b) connecting the input of a cross-link circuit comprising a capacitor to the first line at an intermediate point between the line winding and the compensating winding, and c) connecting the output of the cross-link circuit to a second line.

28. The method of claim 27 in which the core is provided with at least one non-magnetic gap.

29. The method of claim 28 for a three phase power distribution system having a plurality of reactors, comprising the steps of a) connecting a plurality of compensating windings in series between the outputs of the reactors and the load, the compensating windings being disposed on the core and oriented in a polarity opposite to the polarity of the reactors, b) connecting the inputs of cross-link circuits each comprising a capacitor to the lines between the reactors and the compensating windings, and c) connecting the outputs of each cross-link circuits to a line other than the line to which the cross-link circuit input is connected.

30. The method of claim 29 including the step of connecting the outputs of the capacitors to the neutral.

31. The method of claim 29 comprising the step of connecting the inputs of a plurality of cross-link circuits each comprising a capacitor to the first line between the reactor and the compensating winding and connecting the output of each cross-link circuit to a line other than the line to which the cross-link circuit input is connected.

32. The method of claim 28 comprising the step of connecting one or more line windings to the reactor in series and oriented in a like polarity on the core.

33. The method of claim 28 comprising the step of connecting a plurality of compensating windings and oriented in a like polarity on the core.

34. A harmonic mitigating device for mitigating harmonic currents generated by a load connected to a multi-phase power distribution system, comprising a plurality of magnetic cores, a plurality of line windings each having a first end for connection to a first line and a second end, each line winding being disposed on a separate one of the plurality of cores in a first orientation, a plurality of compensating windings each having a first end for connection to the load and a second end, each compensating winding being disposed on one of the plurality of cores in a second orientation opposite to the first orientation, the second end of each compensating winding being connected to a line winding, and at least one cross-link circuit comprising a capacitor having an input connected to an intermediate point between at least one line winding and a compensating winding connected to the at least one line winding, and an output connected to a second line, wherein a reactance between the power distribution system and the load in at least the first line is reduced by a cancellation of fluxes generated by the at least one line winding and the compensating winding disposed on the same core as the at least one line winding, and a selected portion of the harmonic currents is diverted through the cross-link circuit.

35. The device of claim 34 in which at least one core is provided with at least one non-magnetic gap.

36. The device of claim 35 in which each core is provided with at least one non-magnetic gap.

37. The device of claim 36 for a three phase power distribution system, having a plurality of line windings and a plurality of compensating windings disposed on legs of at least one magnetic core, comprising a plurality of cross-link circuits each comprising a capacitor.

38. The device of claim 37 in which outputs of the cross-link circuits are connected to a neutral.

39. The device of claim 37 in which the cross-link circuit comprises a winding disposed on a core and connected in series with the capacitor.

40. The device of claim 37 comprising a plurality of cross-link circuits.

* * * * *

UNITED STATES PATENT AND TRADEMARK OFFICE
CERTIFICATE OF CORRECTION

PATENT NO. : 6,127,743

DATED : October 3, 2000

INVENTOR(S) : Michael Levin, et al

It is certified that error appears in the above-identified patent and that said Letters Patent is hereby corrected as shown below:

On the Title Page, Item [73] Assignee: "1061933 Ontario Inc. " should read ----- Ontario Inc. -----.

Signed and Sealed this

Twenty-ninth Day of May, 2001

*Attest:*

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO. : 6,127,743  
DATED : October 3, 2000  
INVENTOR(S) : Michael Levin et al Page 1 of 1

It is certified that error appears in the above-identified patent and that said Letters Patent is hereby corrected as shown below:

<u>Title page,</u>
Item [73], Assignee: Ontario Inc. should read -- 1061933 Ontario Inc. --

This certificate supercedes certificate of correction issued May 29, 2001

Signed and Sealed this

Twelfth Day of February, 2002

Attest:

JAMES E. ROGAN
*Attesting Officer*     *Director of the United States Patent and Trademark Office*